United States Patent [19]

Bjork et al.

[11] 3,726,198

[45] Apr. 10, 1973

[54] CAMERA SYSTEM INCLUDING OPERATION SEQUENCE CONTROL

[75] Inventors: Albion P. Bjork, Lincoln, Mass.; James M. Conner, Mamaroneck, N.Y.

[73] Assignee: Polaroid Corporation, Cambridge, Mass.

[22] Filed: Oct. 5, 1970

[21] Appl. No.: 77,916

[52] U.S. Cl. ................... 95/37, 95/1.1, 95/12, 95/18, 340/267 R, 116/114 J
[51] Int. Cl. ........................................... G03b 19/02
[58] Field of Search ................... 95/36, 37, 1.1, 18, 95/12, 31 AC, 31 FL; 340/221, 267 R; 116/114 J

[56] References Cited

UNITED STATES PATENTS

| | | | |
|---|---|---|---|
| 1,726,313 | 8/1929 | Ray | 95/37 |
| 3,388,649 | 6/1968 | Dietz | 95/1.1 X |
| 3,345,924 | 10/1967 | Kitrosser | 95/1.1 |
| 2,781,690 | 2/1957 | Fillingame | 95/37 X |
| 2,497,358 | 2/1950 | Huntzinger | 95/37 |
| 3,432,228 | 3/1969 | Hellmund | 352/137 X |
| 3,460,891 | 8/1969 | Bley | 95/12 X |
| 3,505,939 | 4/1970 | Hu | 95/13 |
| 3,134,313 | 5/1964 | Gold | 95/1.1 X |
| 3,338,146 | 8/1967 | Schmidt | 95/11 |
| 2,896,522 | 7/1959 | Stein | 95/1.1 |

Primary Examiner—Samuel S. Matthews
Assistant Examiner—Monroe H. Hayes
Attorney—Brown and Mikulka, William D. Roberson and Robert L. Berger

[57] ABSTRACT

A camera system which, on a single sheet of photographic material, exposes first one area of such sheet of photographic material and thereafter another area of such sheet of photographic material. An optical system for forming images on such photographic material during such exposures. A film holder movable to present such photographic material sheet areas in sequence to such optical system. A system of operational control of such camera system including such movement of such film holder. One part of such control system including indicator lights responsive to various steps of operation of such camera system, including such movement of such film holder. Another part of such control system comprising a covering device which prevents film removal when such film holder is at one point of such movement. A camera system in which each such exposure comprises a subject image and the image of a data card on mutually exclusive portions of each such photographic material sheet areas. A camera system in which two separate pictures may be provided, one in of each of two separate areas of photographic material, using a single optical system and movable photographic material, in which each picture may comprise a subject image and a data image on mutually exclusive portions of such picture, and in which each such single optical system comprises two independent optical paths.

8 Claims, 8 Drawing Figures

INVENTOR.
ALBION P. BJORK
JAMES M. CONNER

Brown and Mikulka
ATTORNEYS

CAMERA SYSTEM INCLUDING OPERATION SEQUENCE CONTROL

This invention relates to photographic systems, and has particular reference to still photography, in situations in which it is desirable to obtain two separate photographs on a single sheet of photographic material.

Such situations are exemplified by identification photography for the production of automobile or other licenses, employment or institutional identification cards, credit cards, and the like. In such situations, it is desirable that use be made of readily available film size. Such film is available for use in cameras which use two optical systems. In some such cameras, each such optical system is in fact made up of two optical systems usable to provide two images on mutually exclusive areas of each photograph.

In order to achieve such separate pictures, it is desirable that both pictures be taken with the same equipment, and under the same circumstances, to use the full extent of the film. Different pictures of different subjects can be taken quickly, no more than a few moments apart, in an inexpensive operation in terms of handling many subjects in a short time.

Two separate cameras, side by side, is an expensive manner of accomplishment of this purpose. Further, there may be undesirable variants between the cameras, as original, or developed in use. Also, differences may appear in the photographic angles or directions or in double optical systems which may be used. Such differences may be controlled, but expensively, and would require continuous service monitoring.

A single camera, having internal systems equating to two cameras, such as two essentially independent optical systems, would have the same, or similar, disadvantages.

The difficulties of the situation are compounded by the multiple photographing needs of identification as necessary today, in that a single photograph often needs to contain, on mutually exclusive areas, a photograph of a subject, and a photograph of data associated with the subject, with the additional feature of reproduction of a validating signature which may incurse on both the subject and data pictures.

Identification card systems of this nature are described in the following copending applications and patents:

| Ser. No. | Inventor | Filing Date | Pat. No. | Issued |
|---|---|---|---|---|
| 864,632 | Pasieka |  |  | 10/7/69 |
| 49,960 | Johnson | 6/25/70 |  |  |
|  | Seiden |  | 3,641,886 | 2-15-72 |
|  | Moodie | - | 3,678,818 | 7-25-72 |
|  | Moodie | - | 3,674,965 | 7-0.4-72 |

One such identification system may have an optical system for the subject, and an optical system for the data, with the two photographs taken sequentially but with the same actuation means and separated only very briefly in time. Thus a two picture system would require four optical systems.

The present invention provides means for efficiently using such a multiple image single picture system in a double photograph device, and in such manner and with such structure as to obviate the difficulties and disadvantages of other possible structures as exemplified by the above discussion.

This invention provides a system for producing such rapidly produceable separate individual or composite photographs in which a single optical system is used. This optical system may be multiple in fact, with one portion for a subject and one portion for data, but it is a single pair where other structures require two pairs of optical systems.

The concept of this invention is to provide a photographic material sheet and to present first one portion of this sheet to the optical system whether it be single or one pair of optical systems, and then to so present another portion of the photographic sheet. In general structure, this invention comprises a camera system with a front section containing the optical system, and a back section containing the photographic film, with this back section movable between up and down positions, to present two different areas of a photographic sheet sequentially to the optical system.

Importantly, this invention involves control means to assure proper operation of this conceptually simple system. This control relates to control of the operational actions of an operator of the camera system. One form of such control is a matter of providing indicator signals, which, if followed by the operator, will assure proper operation of the camera in a logic cycle of sequential operational steps. These signals relate to movement of the camera back up and down for one picture in 'up' position and another picture in 'down' position. They relate, further, to the operation of electronic flash units used in taking each picture, as related to 'wait' time necessary to recharge such flash units between the discharge of one or more of such units in the course of taking one picture and the readiness of such units to take another picture. Further, such signals relate to the situation in which the system is ready for the pulling of a photographic material 'pull tab' in the course treatment and removal of such material from the camera system. Another form of such control is a matter of a physical barrier to improper action by a camera operator in terms of pulling such 'pull tab' at the wrong time, that is, when one picture has been taken and it may otherwise be overlooked that the second picture has not yet been taken. This physical barrier is a flexible apron which, in one position, covers the photographic material 'pull tab' so it cannot be reached by the operator. This apron has one end secured to the fixed, front part of the camera system and its other end secured to the movable back part of the camera system. In the situation wherein one picture has been taken and the back moved to ready the system for the second picture, this apron covers the 'pull tab' until the back is moved again, the operator having been thus reminded to take the second picture.

When desired, such controls may be ignored, but for proper cycling and full use of the system, they must be followed in full logic sequence.

The camera system of this invention, in operation, involves three operator movement situations: (1) movement of the camera actuator, the pushbutton; (2) movement of the camera back, up and down; and (3) the movement involved in pulling the 'pull tab' and removing exposed film from the camera.

It involves three switches in relation to the movement of the camera actuator, three switches in relation to the movement of the camera back, and one switch situation in relation to the pulling of the 'pull tab' and the removal of the exposed film from the camera.

It also involves three indicator lights: (1) WAIT; (2) SHIFT BACK; (3) PULL TAB.

Suitable, common practice electrical and/or electronic circuitry (not shown), is used in connections as necessary to accomplish the various functions of control of the system, as set forth herein.

The electronic flash system for each picture is actuated to discharge as a result of actuating the camera pushbutton. This same action results at least indirectly, in 'wait' light and 'shift back' light coming on. The 'wait' light goes out as a result of a sensor response in a suitable charging circuit for the electronic flash system. The 'shift back' light goes out as a result of movement of the camera back. Movement of the camera back to one position first enables the 'pull-tab' light circuit, and further movement of the camera back to another position actuates the 'pull tab' switch in its then ready circuit. The 'pull-tab' light goes out in the course of removing the exposed film from the camera when the 'pull-tab' is pulled.

An outline of the operation of the system is as follows: Starting with the back and film in the up position, and all lights out, the pushbutton is actuated, the flash system is discharged and 'wait' and 'shift back' lights come on. The back is moved down, extinguishing the 'shift back' light and enabling the 'pull tab' light. When the flash system is recharged, the 'wait' light goes out. The pushbutton is again actuated to take the second picture. The flash system is again discharged, the 'wait' and 'shift back' lights again come on. The back is moved up, extinguishing the 'shift back' light and actuating the 'pull tab' light as it goes. Again, the 'wait' light is extinguished when the flash system has been recharged. The 'pull tab' light is extinguished thereafter, in the course of pulling the tab and removing the exposed film from the camera. The 'pull tab' preventer apron covers the 'pull tab' when the back is in the down position, and is removed from covering the 'pull tab' when the back is in the 'up' position.

As a vehicle of illustration and explanation of this invention, an identification camera system is shown involving a combination of a subject image and a data card image on mutually exclusive areas of a single card.

An object of this invention, therefore, is to provide an improved identification card camera system.

Another primary object of this invention is to provide an improved camera system of the type indicated which includes a unique system of producing identification cards in close succession in such camera system.

A further object of this invention is to provide an improved camera system of the type indicated which includes a unique system which uses one and the same optical system, either single or double, for producing both of said identification cards by logic system controlled means sequentially presenting different areas of a single sheet of photographic material to such one optical system to provide a system requiring minimum operator training and experience.

Other objects and advantages of this invention will be in part apparent and in part pointed out hereinafter and in the accompanying drawings, in which.

BACKGROUND

The operational control system of this invention as applied to cameras, is exemplified in this disclosure and with the accompanying drawings, as applied to an identification card camera as a vehicle of illustration, and, more particularly to a camera system of the self-developing type for sequentially recording images of two scenes on mutually exclusive areas of a sheet of photographic material. Such recordings of images on mutually exclusive areas of a sheet of photographic material is provided on the basis of a special arrangement of polarizing elements. A polarizing plate is provided, as part of this system, with two sections, each having such mutually exclusive areas, and structural and operational detail of this plate is set forth herein.

As a matter of orientation, the above system involves two essentially simultaneous, but sequential, photographic steps. That is, for one identification card, two different scenes are imaged. One is the subject, the person being identified, and the other is a data card relating to that person and the issuing agency. A validation signature is also photographed but basically, two photographs are taken to provide one unit, the single identification card. In this invention, two such multiple image cards are produced on a single sheet of film.

The control system of this invention is thus applied to a camera system like that above as a vehicle of disclosure wherein two such photographs are taken, each comprising the single identification card which itself comprises two photographs.

The camera system of the above sets forth an optical system which has two independent optical paths, one for the subject and one for the data, which are sequentially used for the data and subject.

Accordingly, to produce two separate identification cards in close succession and on different areas of a single photographic sheet, two such double optical systems would ordinarily be required.

This invention obviates such an expensive and bulky system, with increased potential for error, or operational or structural difficulties, by using a single optical system, with two optical paths and by sequentially presenting to such single system, different portions of a single sheet of photographic material. This is accomplished by providing a camera system with a front section including such optical system, and a reciprocatory sliding back section, including a sheet of photographic material.

This is a simple concept of obtaining two identification photographs in quick succession. It is important to provide effective operational controls for implementing this concept. This invention relates to such controls, in the sense of controlling the operational actions of an operator.

STRUCTURE

Figure 1:
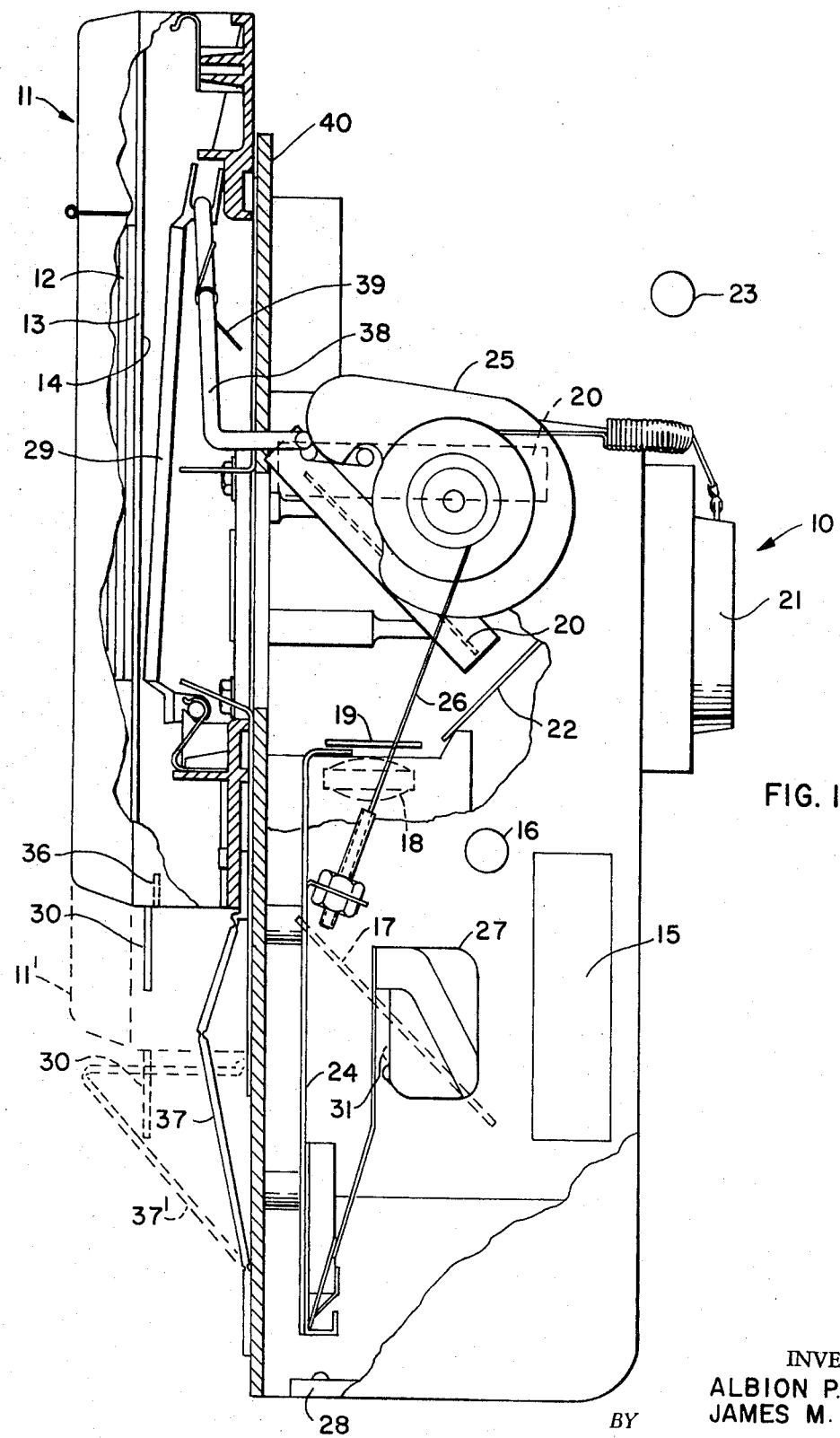
FIG. 1 is a comprehensive showing of much of a camera system embodying this invention, in the form of a side elevation, partially cut away, partially sectional, and schematic in parts.

In FIG. 1, the camera system comprises a front section 10 containing the optical system and a rear section 11 containing a film pack 12. In the rear section 11 a sheet of the film, as a sheet of photographic material 13 presented at a focal plane 14.

In the front section 10, a data card holder 15 is placed for illumination by an electronic flash unit 16, and is provided with an optical system comprising a mirror 17, a lens unit 18, a polarizing member 19, and another mirror 20. This optical system images the data card at the focal plane 14. Further, an objective lens unit 21 is provided, for imaging a subject at the focal plane 14, through a suitable polarizing member (not shown) when the mirror 20 is pivoted up out of the way, with a following baffle 22 to prevent undesirable reflection therefrom. A second electronic flash unit 23 is suitably placed for illuminating the subject, and is suitably operatively associated and synchronized with shutter operation of the objective unit 21.

A camera operating pushbutton on structure 24 is operable to sequentially achieve in either the up or down position of the camera back, first a picture of the data card at 15 by actuating the flash 16 and second, a picture of the subject by first moving the mirror 20 to its up position by means of a cam 25 through a cable connection 26 and then actuating the flash 23 and through a cable a shutter in the lens unit 21. The flash units 16 and 23 are actuated, respectively, through electrical switches 27 and 28. Prior to exposure of the data card, a polarizing plate 29 is moved into overlying contact with the film 13 at the focal plane 14. The polarizing plate 29 contains two sets of polarizing material, with each set suitably related to the polarizing members in the data card and subject optical systems, as exemplified by 19. A validation signature may also be incorporated in each of sets of polarizing material in the polarizing plate 29.

In either the up or down position of the camera back, the camera is actuated by pushing down the button 24. The action is as follows: Switch 31 is actuated, to temporarily disable a charge circuit for the flash units 16 and 23. Polarizer plate 29 is released by cam 25 and moved by spring 39 into overlying position against the film 13, switch 27 is actuated and flash unit 16 is discharged. A picture of a data card in 15 is thus taken, by way of mirror 17, lens unit 18, polarizer 19, and mirror 20. As the pushbutton continues down thereafter, cam 25 is further rotated, mirror 20 is pivoted up out of the way, and switch 28 is actuated, to fire the flash unit 23. A picture of a subject is thus taken, through the lens and shutter unit 21 and a polarizer (not shown) orthogonally disposed with respect to polarizer 19. As the button 24 is released, the system reverts to the situation of FIG. 1.

In the course of operating the camera system of this invention on a controlled basis, there are three movement functions accomplished by the operator. First, the pushbutton 24 is pushed down, and returns to its initial position, FIG. 1, under the action of a suitable return spring, which may be associated with the cam 25. Second, the camera back 11, starting from its up position as shown in FIG. 1, is moved, by hand, down to the FIG. 1 dotted line position after the first picture is taken (data card and subject). After the second picture is taken (again data card and subject) in this down position, the camera back is again moved (by hand), in a return to its original, starting position as in FIG. 1. Third, when both pictures have been taken and the camera back is again in its FIG. 1 position, the operator pulls the pull-tab 30 to initiate development of the exposed film.

Associated with these three movements are various electrical switches involved in the operation of the camera and the operational control thereof. First, the movement of the pushbutton 24 operates three switches: microswitch 27 for firing the data flash unit 16, microswitch 28 for later firing the subject flash unit 23, and a microswitch siamesed with the microswitch 27 and indicated by button 31, this last microswitch being operable with, or just before, microswitch 27 as a temporary disabler for a flash system charge circuit and consequentially one of the indicator lights, as set forth later herein.

Figure 2:
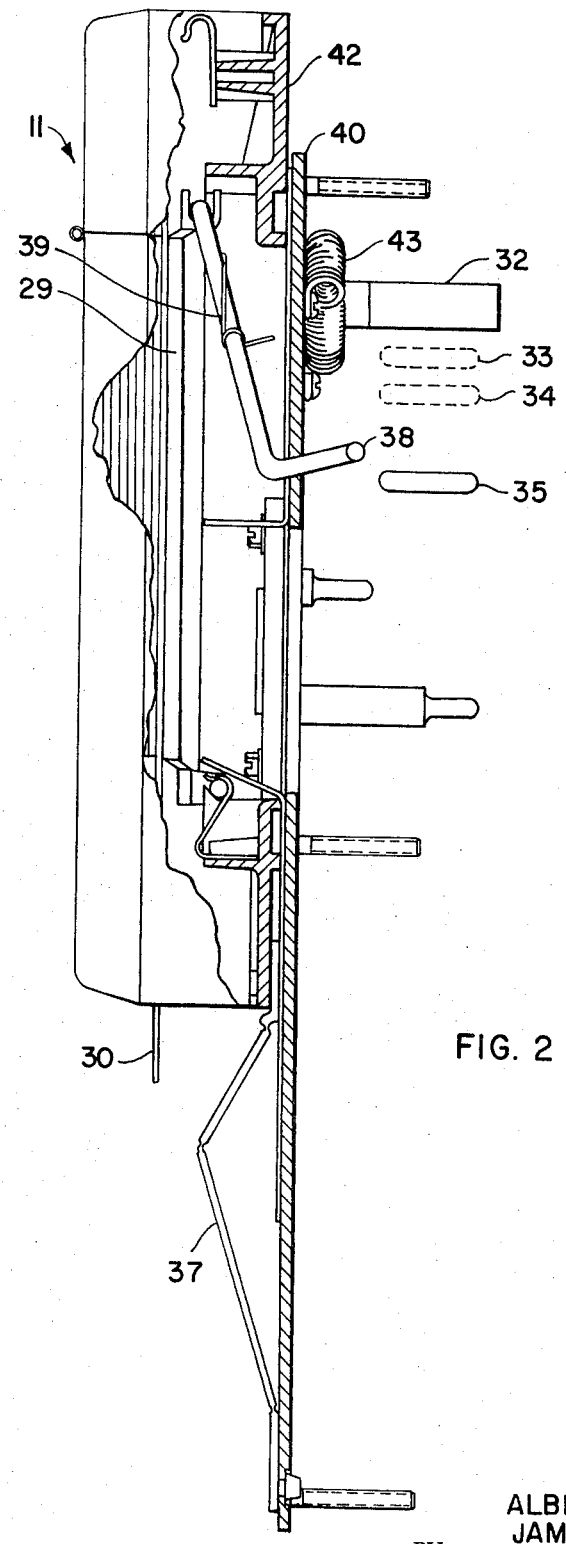
FIG. 2 is a detail development of the sliding back portion of FIG. 1.
Figure 4:
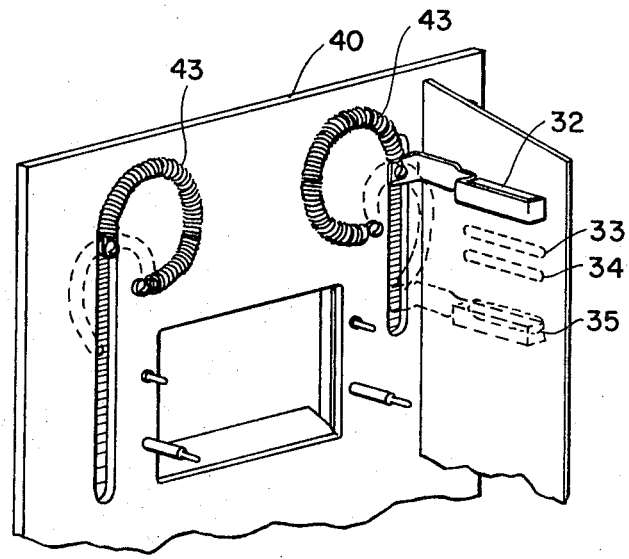
FIG. 4 is a fragmentary perspective of the front (drawing right) side of the structure of FIG. 2.

Second, the movement of the camera back 11 operates three reed switches (see FIGS. 2 and 4) by means of a magnet 32 carried by the camera back in its up and down movement. Reed switch 33 is used to extinguish an indicator light having to do with the movement of the back. Reed switch 35 is used to enable a circuit which is later (when the back is moved up after having been fully down and the second picture taken) energized by reed switch 34 to put on an indicator light relating to pulling the tab 30.

Third, the movement involved in pulling the pull-tab 30. This results in applying chemical developer to the exposed film after both pictures have been taken and in removing the film from the camera. Such film removal actuates a switch indicated at 36, FIG. 1, to extinguish the light relating to pulling the tab 30. Switch 36 is thus a reset device, operable whenever the tab is pulled, whether the pictures are taken or not.

Figure 7:
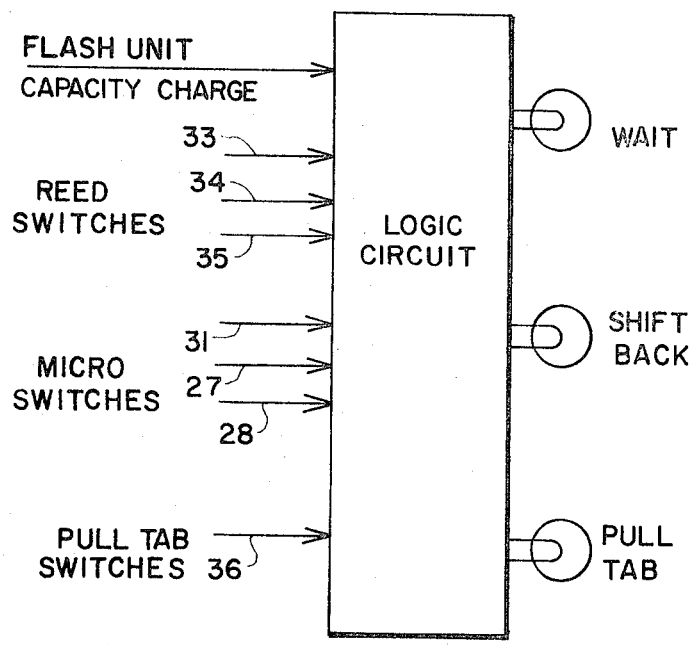
FIG. 7 is a schematic illustration of an indicator logic circuit according to this invention.

Suitable circuitry (not shown) is used for these switch connections, actuations, and systems and is indicated schematically in FIG. 7. Given the location and functional requirements of the system, one skilled in the art can readily set up such circuits. The nature of the operation and condition of such switches is also a matter of suitability to the functions. Depending on the selected circuitry, the switches may be normally open or normally closed, or may be momentary in operation.

Figure 3:
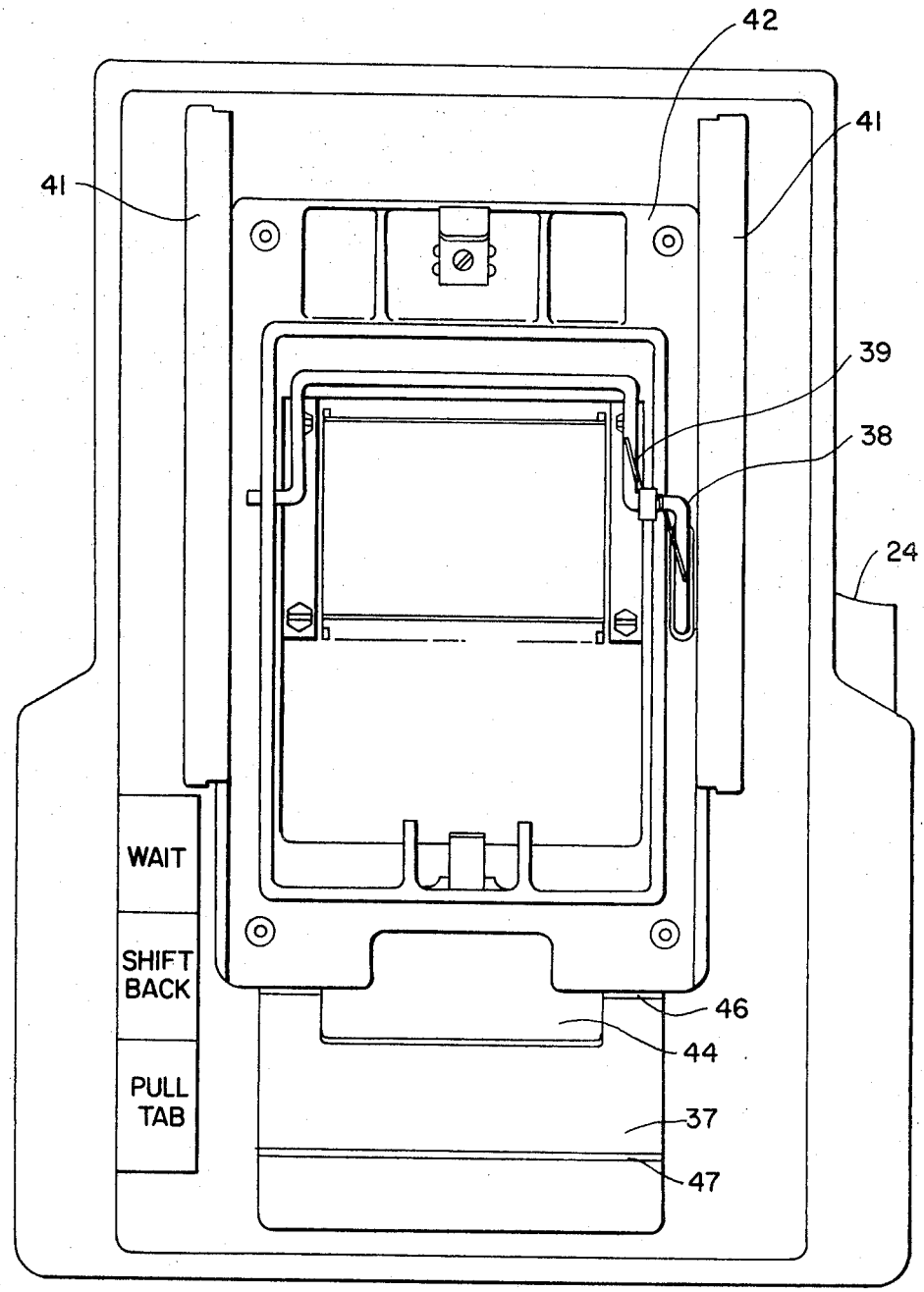
FIG. 3 is a rear face view of the structure of FIG. 2, with certain back portions of FIG. 2 removed, to illustrate the interior.

Associated with such movements and such switches are three indicator lights, FIG. 3, as WAIT, SHIFT BACK; and PULL TAB.

The FIG. 7 block illustration of logic cuircuitry used in the control operations of this invention comprises a logic circuit system into which are fed inputs of flash unit capacity charge, reed switches, microswitches, and the pull tab switch as indicated, with resultant selective operation of the wait, shift back, and pull tab lights.

In the course of starting operation of the system, the film is loaded when the back is in the up position of FIG. 1, All three indicator lights are off. As the actuator button 24 is pushed down, switch 31 temporarily disables the flash unit charger circuit and, switch 27 and switch 28 fire the data flash and face, or subject flash units 16 and 23, in sequence. The WAIT light and the SHIFT BACK light are turned on through circuits energized also by the switches 27 and 28.

Such electronic flash units, as commonly known, are discharge devices, and each is supplied with a capacitor which is discharged, and suitable recharge circuits after such discharge. Since this takes a few seconds, the WAIT light is energized to warn against pushing the actuator button 24 again before the flash units are again fully charged. When they are so charged, a suitable known sensor of this condition responds and establishes a condition in the circuitry which results in extinguishing the WAIT light.

As the camera back is moved down, which may be done before the wait light goes out, the magnet 32 passes the reed switch 33 and its actuation disables the circuitry of the SHIFT BACK light, and this light goes out.

When the back reaches its low point as indicated in FIG. 1, the magnet 32 actuates the enabler reed switch 35, having passed the PULL TAB switch 34 on way down without effect because switch 35 had not yet been actuated.

Then, after the WAIT light goes out, the button 24 may be pushed to take the second, duplicate picture. As before, the flash units 16 and 23 are fired, and the WAIT and SHIFT BACK lights come on.

As the back is moved up thereafter, the magnet 32 again passes the reed switch 34 and the PULL TAB light comes on because its circuit is now enabled through switch 35.

Again, the SHIFT BACK light goes out as the magnet 32 passes reed switch 33 as the camera back is moved up. Again, the WAIT light goes out when the flash units 16 and 23 are recharged. Thereafter, the PULL TAB light goes out in the course of removal of the exposed and developed film from the camera.

As an auxiliary to such electrical indicator warning system as a control of the operators actions in operating the camera, physical blocking means 37 is applied to prevent the tab 30 from being pulled when the camera back is in its down position. This is an added precaution to aid in achieving the full and proper cycle of operation of the system. When the back is down, the PULL TAB light is not on, and before the second picture is taken, the WAIT and SHIFT BACK lights are out. An operator might by mistake assume all is well and pull the tab 30 thus wasting one half of the film. However, with the blocking means 37, in the form of a foldable apron, covering the pull tab, see the dotted line situation of FIG. 1, an operator cannot pull the tab until the back is moved to its up position and the apron 37 is folded to uncover the tab.

Accordingly, the indicator light system and the pull tab apron work together in two forms of control of the operation of the camera system.

In the camera structure, a bail 38 is used to move the polarizing plate 29 toward and away from the film pack 12. When the pictures are taken, the plate 29 is flat against the film, and when the film tab is to be pulled, the plate 29 is moved away from the film. A spring 39 is biased against the camera support structure to constantly urge the plate 29 toward the film pack 12. At the proper time, the cam 25 engages the bail 38 to move it about its mounting pivot and thus pull the plate 29 away from the film. When the back is in the down position, the cam 25 does not contact the bail 38 because there is no need at that stage of the operational cycle, to move the plate 29 away from the film pack.

This camera system has means for sliding the back up and down, with the film holder in it. Thus two identification cards may be produced from each photographic sheet. Thus each plate 29 includes two sections 100, as in FIG. 8; each adapted to overlie approximately one-half of the photographic sheet 13. When the back is in its FIG. 1 solid line position, the lower half of sheet 13 may be employed to produce a first identification card. Subsequently, the camera back, and film, may be slideably displaced downwardly to bring the upper half of the sheet 24, overlaid by a second section 100 of the plate 29, into position for photographic operations.

Figure 8:
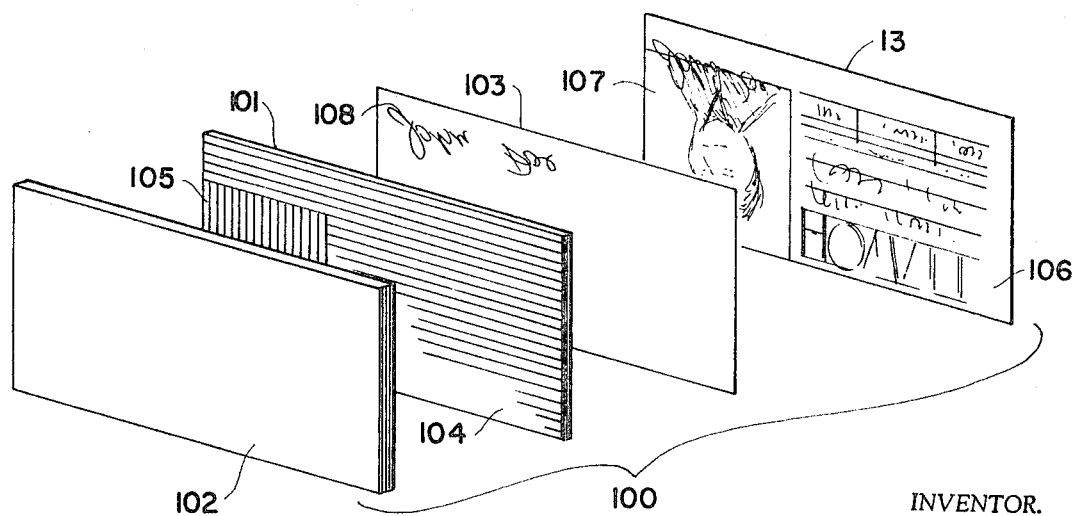
FIG. 8 is a diagrammatic exploded perspective of a section of the validation and polarizing plate forming a part of the camera system of FIG. 1 and illustrating the operable relationship between that plate and a section of a sheet of photographic material mounted in such system.

In FIG. 8, a section 100 of the polarizing plate 29 has been exploded to more clearly illustrate its various components.

As shown in FIG. 8, a sheet 101, of polarizing materials is sandwiched between a pair of transparent support plates 102 and 103. As indicated, the polarizing plate 29 overlies and is positioned in close proximity to the sheet of photographic material 13 when the subject and data card are being photographed. Consequently, the illustrated section of the sheet of polarizing material 101 may have approximately the same dimensions as the finished identification card. In the illustrated embodiment, this sheet 101 comprises a first generally L-shaped section 104 having its transmission axis aligned with that of the light polarizer 19 and a rectangularly shaped section 105 having its transmission axis aligned with that of the light polarizer for the objective 21. The former section 104 has the same size and shape of a section 106 of the photographic sheet 13 which it is adapted to overlie and on which the data card image is intended to be recorded, while the latter section 105 has the same size and shape of a section 107 of the photographic sheet 13 which it is adapted to overlie and on which the subject's image is intended to be recorded. Conventional means may be employed to fabricate the sheet of polarizing materials 101. For instance, this sheet 101 may comprise a lamination of polyvinyl alcohol sheets, each having been stretched and molecularly oriented so as to be birefringent, appropriately dyed and printed in accordance with current techniques to provide the aforementioned sections 104 and 105 having orthogonally aligned transmission axes. Alternately, other conventional forms of polarizing sheet material may be cut, aligned and mounted on a suitable transparent support.

The support plates 102 and 103 may be formed with any suitable material, such as an acrylic lucite or a glass, and appropriately adhered to the opposed faces of the sheet 101. These support plates 102 and 103 not only serve to support the sheet of polarizing materials, 101 but also serve to protect that sheet from foreign matter, abrasion, etc. Importantly, the support plate 103 is provided with indicia 108, such as a validating signature, company name, trademark, or other symbol, which it is intended to photographically reproduce on the sheet of photographic material 13. In this respect, such indicia may be hot stamped in an opaque ink into a surface of the support 103. Preferably, it would be stamped into the surface of that support plate 103 intended to be mounted adjacent the sheet of photographic material 13 and at a position thereon so as to be photographically reproduced in part on the section 107 thereof and in part on the section 106 thereof. When the plate 29 is disposed against the sheet 24, the sections 104 and 105 of its sheet of polarizing materials 101 respectively overlie the sections 106 and 107 of the photographic sheet 13. To minimize any distortion of the images, it is desirable that the support plate 103 be relatively thin.

It will thus be appreciated that the polarizing plate 29, in combination with the light polarizers like 19 serves to effectively limit the light rays intersecting section 107 of the sheet of photographic material 13 to those from the subject and to limit the light rays intersecting section 106 of the sheet of photographic material to those from the data card 15. Further, it is naturally desirable that light rays from the data card 15, which are polarized by the element 19, be directed effectively and efficiently onto the appropriate section 106 of the photographic sheet 13. As indicated, at the same time, it is desirable that section 105 of the sheet 101 preclude any such rays from impinging upon section 107 of the photographic sheet 13. Consequently, the polarization characteristics of such light rays should not be distorted or changed to any extent intermediate the element 19 and the sheet 13. In this respect, the alignment of the mirror 20 and the polarizing element 19 is preferably such that the transmission axis of that element is parallel to the plane of the mirror. Any deviation from this type of alignment could result in a component of the light rays being oriented parallel to the transmission axis of the section 105 of the sheet 101, whereby such component would pass through that section of the sheet 101 onto section 107 of the photographic sheet 13.

In order to reduce the pull force which must be exerted by the operator on the tab 30 to effect the removal of each film unit from the film holder 11, and further, to preclude scratching the exposed surface of the photographic sheet 13 at such time, it is desirable that the polarizing plate 29 be positioned out of contact with an exposed photographic sheet whenever such a sheet is being withdrawn from the film holder. Consequently, the validation plate 29 is mounted within the camera system for selective displacement between its position as shown in FIG. 1 of the drawings and its position against the film 13.

In the up position of the film holder as in solid lines in FIG. 1, when the pushbutton 24 is actuated, cam 25 rotates and releases the bail 38 to allow spring 39 to move the polarizing plate 29 to and against the film 13. As the button 24 is released, after the flash units 16 and 23 have been fired, cam 25 reverses, and again engages the bail 38 to move the plate 29 away from the film 13. Thus at this point the pull-tab 30 may be pulled, if desired, without damage to the film from scraping engagement with the plate 29, and with low pull force. Thereafter, when the film holder 11 is moved down to its second position, as at 11 in dotted lines in FIG. 1, the bail 38 moves down and out of contact with the cam 25. Thus pushing the button 24 and rotating the cam 25 in taking pictures of data and subject in the down position of the film, has no effect in terms of movement of the polarizing plate with respect to the film 13. The plate 29 stays in contact with the film until the film holder is again moved up and the bail 38 again engages the cam 25. This system is thus not designed to accomodate pulling the tab in the down position. As a protective control in this situation, the apron 37 is in tab covering position 37 so the operator cannot pull the tab 30.

The camera back support plate 40 has a pair of vertical channel guide members 41 secured thereto to receive and guide a back slide plate 42. The polarizing plate 29 is mounted, with the bail 38, on the slide plate 42 for movement up and down therewith, along with the film pack 12. A sheet of photographic material is thus moved up and down to present different portions thereof to the optical system of the camera to achieve two photographs or two identification cards on the same sheet of photographic material.

The camera back is moved manually, up and down to and from a top position and a down position. In aid of this movement and as means of holding the back in whichever position it is moved to, center override coil springs 43 each have one end secured to the back support 40 and the other end secured to the slide plate 42. In this arrangement, as the back is moved from one position, each spring opposes the movement until an intermediate spot is reached, when the springs snap over and aid the continuing movement to and hold in the new position.

Figure 5:
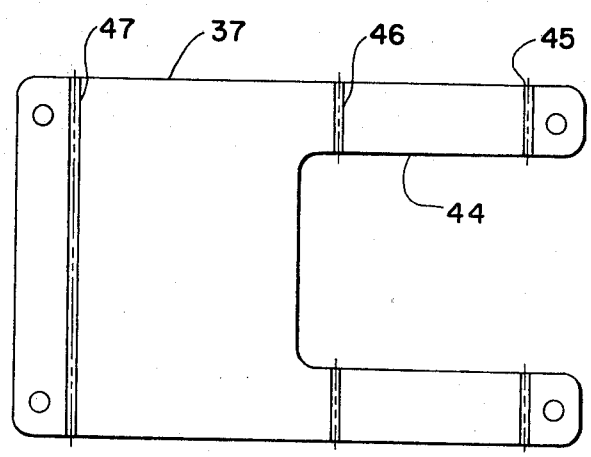
FIG. 5 is a face view of a pull-tab preventer apron, shown also in FIGS. 1, 2, and 3.

The apron 37 has its lower end secured to the back support plate 40 and its upper end secured to the slide plate 42. As best seen in FIG. 5, the apron 37 has a top cut-out portion 44 to receive the pull-tab when the back is down. The apron may be made out of plastic, with living hinges at transverse fold areas 45, 46, and 47 to facilitate folding action of the apron as the back is moved up and down. As shown in FIG. 1, in the up position of the back, the apron has left the pull-tab uncovered, but the apron remains somewhat bent to facilitate bending in the right direction to achieve its FIG. 1 dotted line position, when the back is moved down, to cover the tab 30. As the back moves down, the tab drops into the apron cut-out 44.

Figure 6:
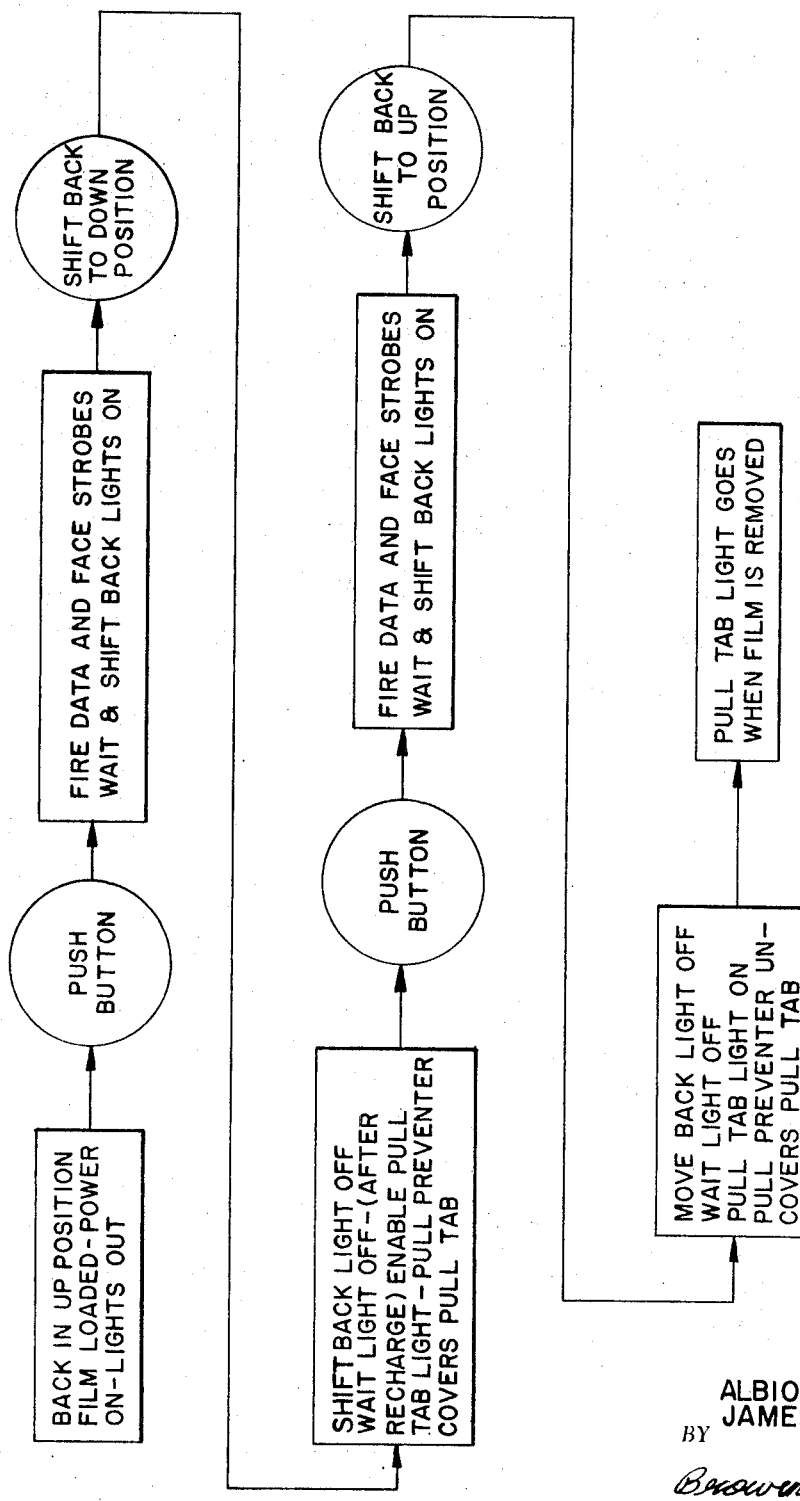
FIG. 6 is an operational flow block diagram of a camera system according this invention.

The FIG. 6 flow chart is intended as a general guide to the cycle of operation of the camera system according to this invention.

This invention accordingly provides a useful system of operational control for a camera system in which identification photographs are produced in quick succession. In a unique protective combination, a system of indicator warnings is combined with physical preventive means to aid in achieving proper operational cycles, repeatedly operational in the same direction.

As many embodiments may be made of the above invention, and as changes may be made in the embodiment set forth above without departing from the scope of the invention, it is to be understood that all matter set forth hereinbefore and in the accompanying drawings is to be interpreted as illustrative only and not in a limiting sense.

We claim:

1. A camera system of the self-developing type comprising a sliding film container for moving a sheet of photographic material to sequentially register different portions of such sheet for exposure to an image produced in such system, said sheet of photographic material including a pull-tab accessible exteriorly of said container to facilitate its withdrawal therefrom, cover means operable by said movement of said film container to periodically cover said pull-tab and prevent its use, electrical switch means actuable by said movement of said film container, and indicator means responsive to actuation of such switch means in representation of operational situations of said system as effected by said movement of said film container.

2. A camera system of the self-developing type, comprising:
a first section including an optical system for forming an image of a given size at a focal plane;
a second section attached to said first section and including means for mounting a sheet of photographic material in said focal plane, such photographic sheet being at least twice said given size and having a pull-tab accessible exteriorly of said second section to facilitate its withdrawal therefrom, and means for spreading a processing fluid across such sheet of photographic material as such sheet of photographic material is withdrawn from said second section;
means for achieving relative movement between said second section and said optical system to sequentially present first and second areas of such sheet of photographic material to said optical system whereby said first area may be first exposed to record an image thereon and, after said second section has been moved with respect to said optical system, said second area may be exposed to record an image thereon; and
means for controlling the sequence of various operational steps of said camera system performed by an operator to maintain a predetermined pattern and logic direction of said steps, the actuation of said controlling means being responsive to said relative movement between said second section and said optical system, said sequence controlling means comprising cover means operable by such relative movement to periodically cover said pull-tab and prevent its use by the operator and a panel of indicator lights responsive to said various steps of operation of said camera system including such relative movement between said second section and said optical system.

3. A camera system comprising:
a first section including means for forming an image of a subject at a focal plane;
a second section attached to said first section and including means for mounting a sheet of photographic material at said focal plane and for spreading a processing fluid across said sheet after exposure thereof, said second section being provided with an opening through which a pull-tab attached to said sheet of photographic material extends to facilitate the actuation of said means for so spreading said processing fluid;
means for displacing said second section between a position wherein said image is formed on a first area of said photographic sheet and a position wherein said image is formed on a second area of said photographic sheet;
electrical switch means attached to one of said sections, adjacent the other of said sections;
electrical switch actuating means attached to said other of said sections, whereby said displacement of said second section results in actuation of said switch means;
signal means connected to and responsive to action of said switch means in representation of a condition of displacement of said second section; and
cover means operable by displacement of said second section to periodically cover said pull-tab and prevent its use.

4. The camera system of claim 3 wherein said switch and signal means additionally include means for indicating a condition of said displacement desirable to the actuation of said pull-tab.

5. The camera system of claim 3 wherein said cover means comprises a flexible apron having one end secured to said first section and the other end secured to said second section in such manner that said displacement of said second section in one direction results in said pull-tab being covered by said apron.

6. A camera system of the self-developing type comprising:
a first section including an optical system for forming an image of a scene at a focal plane and in a predetermined area of said focal plane;
a second section attached to said first section for sliding movement thereon and including means for mounting a sheet of photographic material at said focal plane, said sheet of photographic material including a pull-tab accessible exteriorly of said second section to facilitate its withdrawal therefrom, and means for spreading a processing fluid across said sheet after exposure thereof and as said sheet of photographic material is withdrawn from said second section, said sliding movement being effective to selectively present different portions of said photographic sheet into overlying coincidence with said predetermined area of said focal plane;
means for operating said camera comprising an actuating device and an electronic flash unit;
means for controlling the operation of said camera in the form of an electrical system comprising electrical switch means operable by said sliding movement of said second section, electrical switch means operable by said actuating device, and indicator means responsive to the operation of said electrical switch means, said switch and indicator means including means for representing a next needed step of movement of said second section, means for representing delay periods necessary between forming images in said different portions of said photographic sheets, as related to the proper and effective use of said electronic flash unit, and means for representing the suitable situation for pulling said pull-tab, in terms of and when said image has presumably been impressed on both of said different portions of said photographic sheet and said thus exposed sheet is ready for said spreading of processing fluid thereacross; and cover means operable by said movement of said second section to periodically cover said pull-tab and prevent its use.

7. A camera system of the self-developing type comprising:

a first section, including an optical system for forming an image of a scene at a focal plane and in a predetermined area of said focal plane;

a second section attached to said first section for up and down sliding movement thereon and including means for mounting a sheet of photographic material at said focal plane, said sheet of photographic material including a pull-tab accessible exteriorly of said second section to facilitate its withdrawal therefrom, means for spreading a processing fluid across said sheet after exposure thereof and as said sheet of photographic material is withdrawn from said second section, said sliding movement being effective to selectively present each of two different portions of said photographic sheet into overlying coincidence with said predetermined area of said focal plane;

means for operating said camera comprising an actuating device, and rechargeable electronic flash means for illuminating said scene;

cover means operable by said movement of said second section to periodically cover said pull-tab and prevent its use;

first electrical switch means operable by said actuating device and connected to actuate said electronic flash means;

an indicator 'wait' light connected for actuation 'on' as a result of operation of said first switch and discharge of said flash means;

an indicator 'shift back' light connected for actuation 'on' as a result of operation of said first switch;

second electrical switch means operable by said movement of said second section;

electrical connection from said second switch for actuation 'off' of said 'shift back' light;

third electrical switch means operable by said movement of said second section;

an indicator 'pull tab' light connected for being enabled by said third switch;

fourth electrical switch means, operable by said movement of said second section and connnected as an actuation 'on' for said 'pull tab' light when said 'pull tab' light has been enabled by operation of said third switch;

sensor means responsive to discharge of said flash means and connected to energize said 'wait' light when such discharge occurs, and responsive to recharge of said flash means to deenergize said 'wait' light when said flash means is again ready for use; and fifth electrical switch means, operable when said exposed and treated photographic sheet is removed from the camera system, connected to result in extinguishing said 'pull tab' light, when thus operated;

said various elements and means of said camera system being mechanically arranged and electrically connected with respect to each other to effectuate the following operational sequence, in which said second section is the 'back':

1. situation — Back in 'up' position, All lights 'out;'
2. action — Button (actuator device) is pushed;
3. situation — Electronic flash is fired; 'Wait' light comes on; 'Shift back' light comes on;
4. action — Move back to 'down' position;
5. situation — 'Shift back' light goes out; 'Wait' light goes out after recharge period; 'Pull tab' light is enabled; Pull preventer covers pull tab;
6. action — Button (actuator device) is pushed;
7. situation — Repeat of (3);
8. action — Move back to 'up' position;
9. situation — 'Shift back' light goes out; 'Wait' light goes out after recharge period; 'Pull tab' light comes on; Pull tab is free of pull preventer;
10. Pull tab light is extinguished when photographic sheet is removed from said camera system.

8. A camera system according to claim 7 wherein said scene is made up of two scenes imaged on mutually exclusive parts of each of said portions of said photographic sheet.

* * * * *